US011156988B2

(12) United States Patent
Yamaguchi

(10) Patent No.: US 11,156,988 B2
(45) Date of Patent: Oct. 26, 2021

(54) DRIVE APPARATUS AND MACHINE LEARNING APPARATUS

(71) Applicant: FANUC Corporation, Yamanashi (JP)

(72) Inventor: Takehiro Yamaguchi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 78 days.

(21) Appl. No.: 16/355,859

(22) Filed: Mar. 18, 2019

(65) Prior Publication Data

US 2019/0294153 A1   Sep. 26, 2019

(30) Foreign Application Priority Data

Mar. 23, 2018 (JP) .............................. JP2018-056873

(51) Int. Cl.
*G05B 19/418* (2006.01)
*H02P 6/08* (2016.01)
*G06N 20/00* (2019.01)

(52) U.S. Cl.
CPC ......... *G05B 19/4183* (2013.01); *G06N 20/00* (2019.01); *H02P 6/08* (2013.01)

(58) Field of Classification Search
CPC .............. G05B 19/418; G05B 19/4183; G05B 2219/33321; G05B 2219/33034; G05B 19/18; G05B 2219/37254; G05B 2219/35534; H02P 6/08; H02P 23/14; G06N 20/00; G06N 3/08; G06N 3/006; G05D 13/62

See application file for complete search history.

(56) References Cited

U.S. PATENT DOCUMENTS

| | | | |
|---|---|---|---|
| 2017/0090430 A1 | 3/2017 | Nakazawa | |
| 2017/0111000 A1* | 4/2017 | Saito | H02P 27/06 |
| 2017/0154283 A1 | 6/2017 | Kawai et al. | |
| 2018/0026573 A1* | 1/2018 | Akashi | G06N 3/084 |
| | | | 318/6 |

FOREIGN PATENT DOCUMENTS

| | | |
|---|---|---|
| JP | 2014-204622 A | 10/2014 |
| JP | 2017-64837 A | 4/2017 |
| JP | 2017-102613 A | 6/2017 |
| JP | 2018-14838 A | 1/2018 |

* cited by examiner

*Primary Examiner* — Tejal Gami
(74) *Attorney, Agent, or Firm* — Hauptman Ham, LLP

(57) ABSTRACT

A drive apparatus which controls a speed or a torque of a servo motor of a processing machine according to a command obtained by converting an external command input from outside includes a machine learning apparatus which learns appropriate conversion from the external command to the command. The machine learning apparatus includes: a state observing unit which observes the external command, the command, and a state of the processing machine or the servo motor as state variables that represent a present state of an environment; a determination data acquiring unit which acquires determination data indicating an evaluation result of processing by the processing machine; and a learning unit which learns the external command and the state of the processing machine or the servo motor, and the command, in association with each other using the state variables and the determination data.

9 Claims, 10 Drawing Sheets

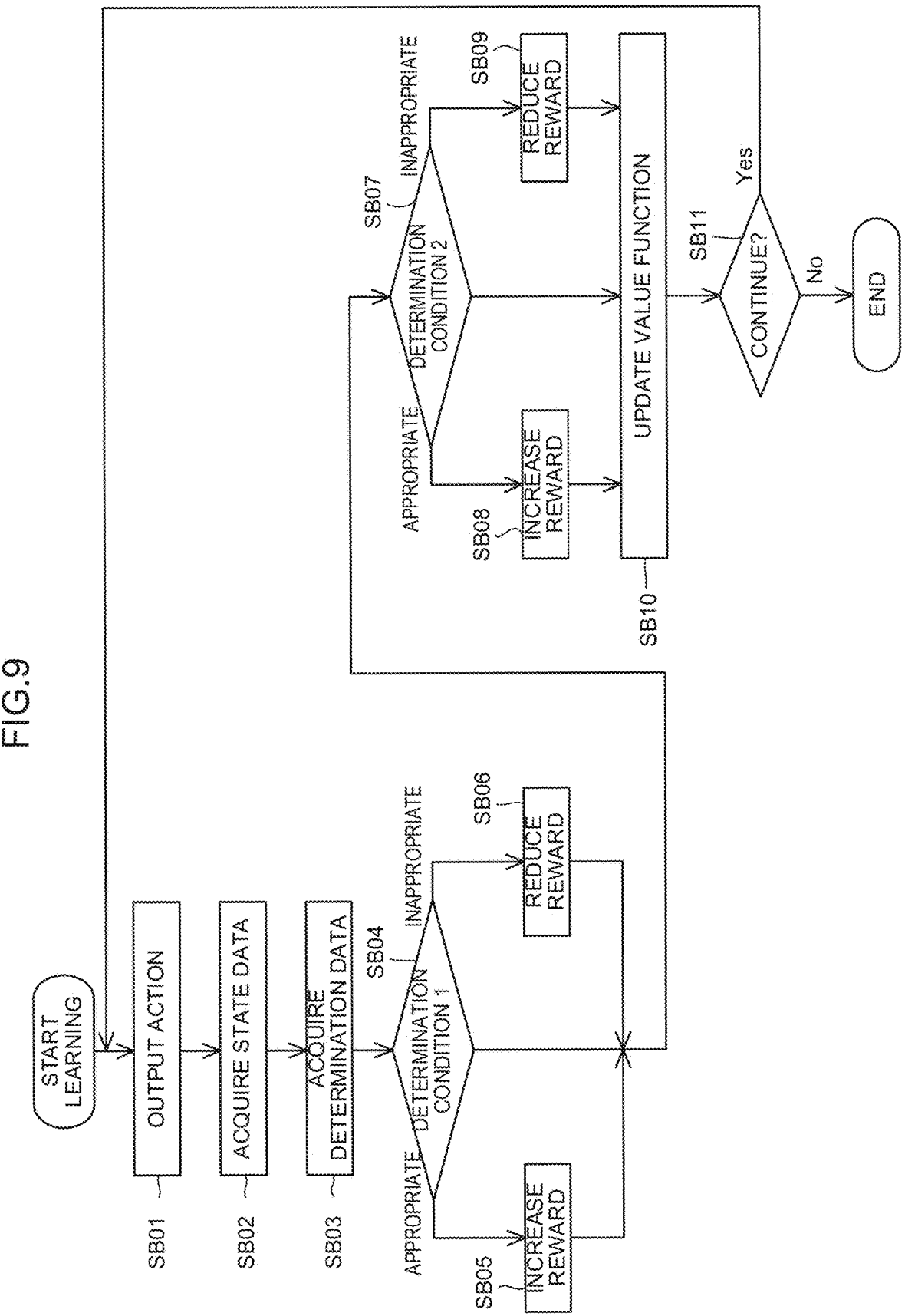

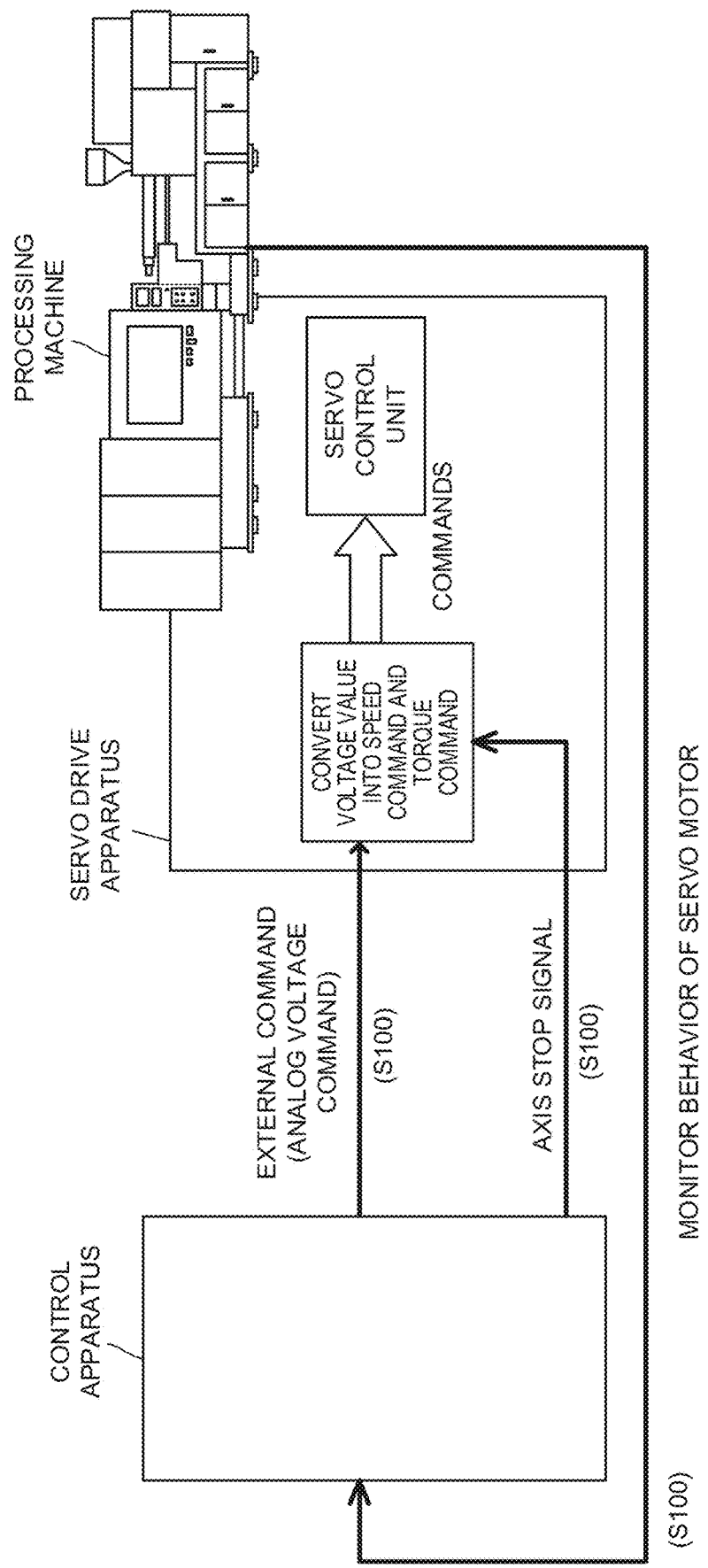

DRIVE APPARATUS AND MACHINE LEARNING APPARATUS

RELATED APPLICATION

The present application claims priority to Japanese Application Number 2018-056873 filed Mar. 23, 2018, the disclosure of which is hereby incorporated by reference herein in its entirety.

BACKGROUND OF THE INVENTION

1. Field of the Invention

The present invention relates to a drive apparatus and a machine learning apparatus and, particularly, to a drive apparatus and a machine learning apparatus which optimize a command generated in response to an external command.

2. Description of the Related Art

There are drive apparatuses which receive a command (hereinafter, referred to as an external command) output by a control apparatus and generate a command (hereinafter, simply referred to as a command) for controlling a device. In a typical example, as shown in FIG. 10, a control apparatus outputs an analog voltage command as an external command, a servo motor drive apparatus subjects the analog voltage command to A/D conversion and generates a speed command and a torque command, and a servo motor is driven by commands (the speed command and the torque command) after the conversion.

While a command value is transmitted in the form of an analog voltage value in the case of an analog voltage command, due to input offset voltage, noise, and the like which result from semiconducting properties and the effect of temperature variation (a temperature drift), an error may occur between a command value intended by the control apparatus and a command value interpreted by the drive apparatus based on the received analog voltage value. Such an error adversely affects controllability of the servo motor and may cause phenomena such as an increase in cycle time, a decline in responsiveness, a decline in processing quality, and an increase in power consumption.

Conventionally, in order to suppress an occurrence of such phenomena, a servo motor is prevented from malfunctioning even when an error is created in a received analog voltage command value by implementing measures such as: (1) when a control apparatus outputs a 0 V command as an external command, a servo off signal and an axis stop signal are output at the same time; (2) the control apparatus monitors a behavior of the servo motor and outputs an external command that cancels out (in an opposite direction to) the behavior of the servo motor (assembles a loop); and (3) a dead band or a filter is provided (for example, voltage fluctuations of ±0.001 V are invalidated).

As a related technique, Japanese Patent Application Laid-open No. 2017-102613 describes a motor control apparatus which calculates, by machine learning, correction amounts of a position command, a speed command, and the like for controlling a motor.

The method described in Japanese Patent Application Laid-open No. 2017-102613 is aimed at correcting a deterioration in smoothness of feeding of a feed axis which occurs due to various mechanical factors and is not intended to correct an error which is created between a command value intended by a control apparatus and a command value interpreted by a drive apparatus and which may cause unfavorable phenomena such as those described above.

The conventionally performed measures (1) and (2) have a problem in that an elaborate mechanism including addition of hardware and complex control by a control apparatus must be constructed. (3) has a problem in that fluctuations in command values which fall below a threshold of a dead band or a filter as well as errors exceeding the threshold cannot be accommodated. Therefore, the measures are insufficient and additional measures are conceivably required.

SUMMARY OF THE INVENTION

The present invention has been made to solve such problems and an object thereof is to provide a drive apparatus and a machine learning apparatus which optimize a command generated in response to an external command.

A drive apparatus according to an embodiment of the present invention is a drive apparatus which controls a speed or a torque of a servo motor of a processing machine according to a command obtained by converting an external command input from outside, the drive apparatus including a machine learning apparatus which learns appropriate conversion from the external command to the command, wherein the machine learning apparatus includes: a state observing unit which observes the external command, the command, and a state of the processing machine or the servo motor as state variables that represent a present state of an environment; a determination data acquiring unit which acquires determination data indicating an evaluation result of processing by the processing machine; and a learning unit which learns the external command and the state of the processing machine or the servo motor, and the command, in association with each other using the state variables and the determination data.

In the drive apparatus according to an embodiment of the present invention, the state variables include, as the state of the processing machine or the servo motor, at least one of a speed command value, a torque command value, a position feedback, a speed feedback, a torque feedback, a motor current value, and a motor temperature of each shaft of the processing machine, a cycle time of the processing, a temperature of each unit of the processing machine, a shape and a raw material of a material used in the processing, and a shape and a raw material of a die used in the processing.

In the drive apparatus according to an embodiment of the present invention, the determination data includes at least one of a precision and a quality of a processed product, a vibration of the processing machine, a die, or a ball screw, a load on the servo motor, power consumption by the processing machine, and a cycle time of the processing.

In the drive apparatus according to an embodiment of the present invention, the learning unit includes: a reward calculating unit which obtains a reward related to the evaluation result; and a value function updating unit which updates, using the reward, a function representing a value of the command with respect to the external command and the state of the processing machine or the servo motor.

In the drive apparatus according to an embodiment of the present invention, the learning unit calculates the state variables and the determination data in a multilayered structure.

The drive apparatus according to an embodiment of the present invention further includes a decision making unit which outputs a value of the command based on a learning result by the learning unit.

In the drive apparatus according to an embodiment of the present invention, the learning unit performs learning using the state variables and the determination data obtained from a plurality of the drive apparatuses.

In the drive apparatus according to an embodiment of the present invention, the machine learning apparatus is realized by a cloud computing environment, a fog computing environment, or an edge computing environment.

A machine learning apparatus according to an embodiment of the present invention is a machine learning apparatus which learns appropriate conversion from an external command that is input to a drive apparatus from outside to a command for controlling a speed or a torque of a servo motor of a processing machine, the machine learning apparatus including: a state observing unit which observes the external command, the command, and a state of the processing machine or the servo motor as state variables that represent a present state of an environment; a determination data acquiring unit which acquires determination data indicating an evaluation result of processing by the processing machine; and a learning unit which learns the external command and the state of the processing machine or the servo motor, and the command, in association with each other using the state variables and the determination data.

According to the present invention, a drive apparatus and a machine learning apparatus which optimize a command generated in response to an external command can be provided.

BRIEF DESCRIPTION OF THE DRAWINGS

The above and other objects and features of the present invention will become apparent from the following description of embodiments when considered together with the accompanying drawings, in which:

FIG. 9 is a schematic flow chart showing an aspect of a machine learning method; and FIG. 10 is a diagram schematically illustrating an operation of a drive apparatus.

DETAILED DESCRIPTION OF THE PREFERRED EMBODIMENTS

A drive apparatus 1 according to an embodiment of the present invention receives an external command which is output from a control apparatus and which includes an error, converts the received external command, and generates and outputs a command which is typically used to drive a device (a servo motor or the like). Due to the command, the device is driven and processing is performed. The drive apparatus 1 is capable of evaluating a propriety of a result of the processing and optimizing conversion from the external command to the command so as to improve processing results.

The control apparatus is, typically, an apparatus which controls a processing machine. For example, the control apparatus of an injection molding machine is capable of controlling a plurality of axes such as an injection axis, a measurement axis, a mold-clamping axis, a projecting axis, a plasticizing axis, and an additional axis. For example, the drive apparatus 1 is an apparatus which drives a servo motor of one axis among these axes and which is subordinate to the control apparatus. The drive apparatus 1 receives an analog voltage command output from the control apparatus, subjects the analog voltage command to A/D conversion and generates a speed command value and a torque command value, and outputs the command values to actually drive a servo motor.

Figure 1:
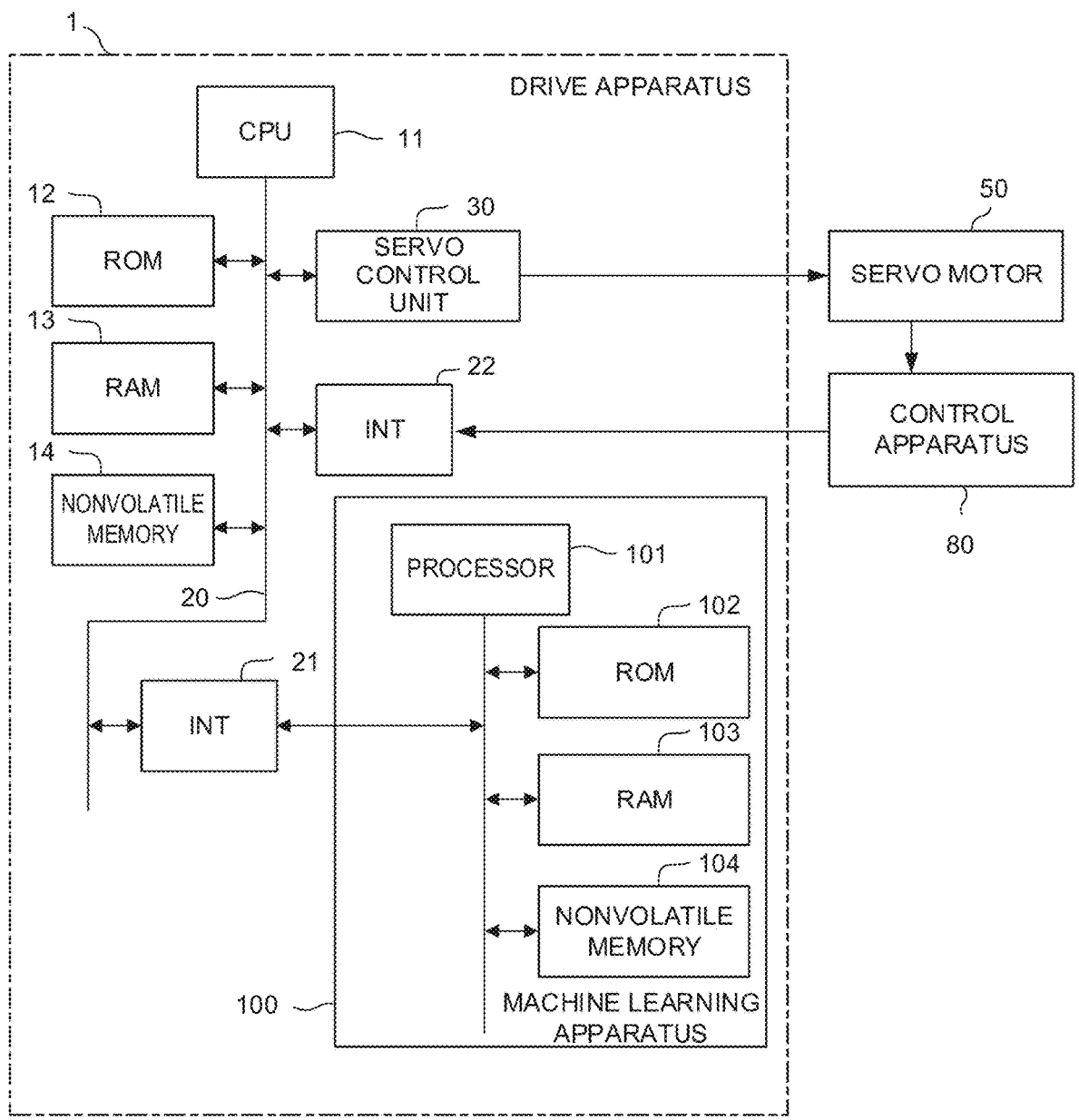
FIG. 1 is a schematic hardware configuration diagram of a drive apparatus according to a first embodiment.

FIG. 1 is a schematic hardware configuration diagram including the drive apparatus 1 according to the first embodiment of the present invention and a servo motor that is driven by the drive apparatus 1. The drive apparatus 1 includes a CPU 11, a ROM 12, a RAM 13, a nonvolatile memory 14, an interface 21, an interface 22, a bus 20, and a servo control unit 30. A servo motor 50 and a control apparatus 80 are connected to the drive apparatus 1.

The CPU 11 is a processor which controls the entire drive apparatus 1. The CPU 11 reads a system program stored in the ROM 12 via the interface 22 and the bus 20 and controls the entire drive apparatus 1 in accordance with the system program.

The ROM 12 stores, in advance, various system programs (including a system program for controlling communication with a machine learning apparatus 100 to be described later) necessary for executing drive control of the servo motor 50 and the like.

The RAM 13 temporarily stores temporary calculation data and the like.

The nonvolatile memory 14 is backed up with, for example, a battery (not shown) and is capable of retaining its storage state even when a power supply of the drive apparatus 1 is turned off. The nonvolatile memory 14 stores various programs, data, and the like. The programs and the data stored in the nonvolatile memory 14 may be deployed onto the RAM 13 during execution and use.

The servo control unit 30 receives a speed command and a torque command output by the CPU 11 and drives the servo motor 50.

The servo motor 50 is driven by the servo control unit 30 and moves axes provided in the processing machine. Typically, the servo motor 50 may have a built-in position/speed detector. The position/speed detector outputs a position/speed feedback signal, and feedback control of position and speed is performed as the position/speed feedback signal is fed back to the control apparatus 80.

It should be noted that, while the control apparatus 80 and the drive apparatus 1 are connected to each other on a one-to-one basis in FIG. 1, in reality, the drive apparatus 1 is connected to the control apparatus 80 in the number corresponding to the number of axes provided in the processing machine that is a control object. For example, in the case of the control apparatus 80 which controls a processing machine provided with six axes, a total of six drive apparatuses 1 corresponding to the respective axes are connected to the control apparatus 80.

The control apparatus 80 is an apparatus for controlling a processing machine and is constituted by, for example, a numerical control apparatus. The control apparatus 80 generates an external command for controlling an axis in accordance with a processing program and delivers the external command to the CPU 11 via the interface 22. While an external command is typically input as an analog voltage value, the analog voltage value may include an error attributable to an input offset voltage, noise, or the like. In addition, the control apparatus 80 delivers various pieces of data necessary for machine learning (to be described later) to the CPU 11 via the interface 22.

The interface 21 is an interface for connecting the drive apparatus 1 and the machine learning apparatus 100 with each other. The machine learning apparatus 100 includes a processor 101, a ROM 102, a RAM 103, and a nonvolatile memory 104.

The processor 101 controls the entire machine learning apparatus 100. The ROM 102 stores system programs and the like. The RAM 103 performs temporary storage in respective processes related to machine learning. The nonvolatile memory 104 stores learning models and the like.

The machine learning apparatus 100 observes, via the interface 21, various pieces of information (external commands, various pieces of data, and the like input from the control apparatus 80) which can be acquired by the drive apparatus 1. The machine learning apparatus 100 outputs commands (a speed command and a torque command) for driving the servo motor 50 to the drive apparatus 1 via the interface 21. The drive apparatus 1 receives a command output by the machine learning apparatus 100 and outputs the command to the servo control unit 30.

Figure 2:
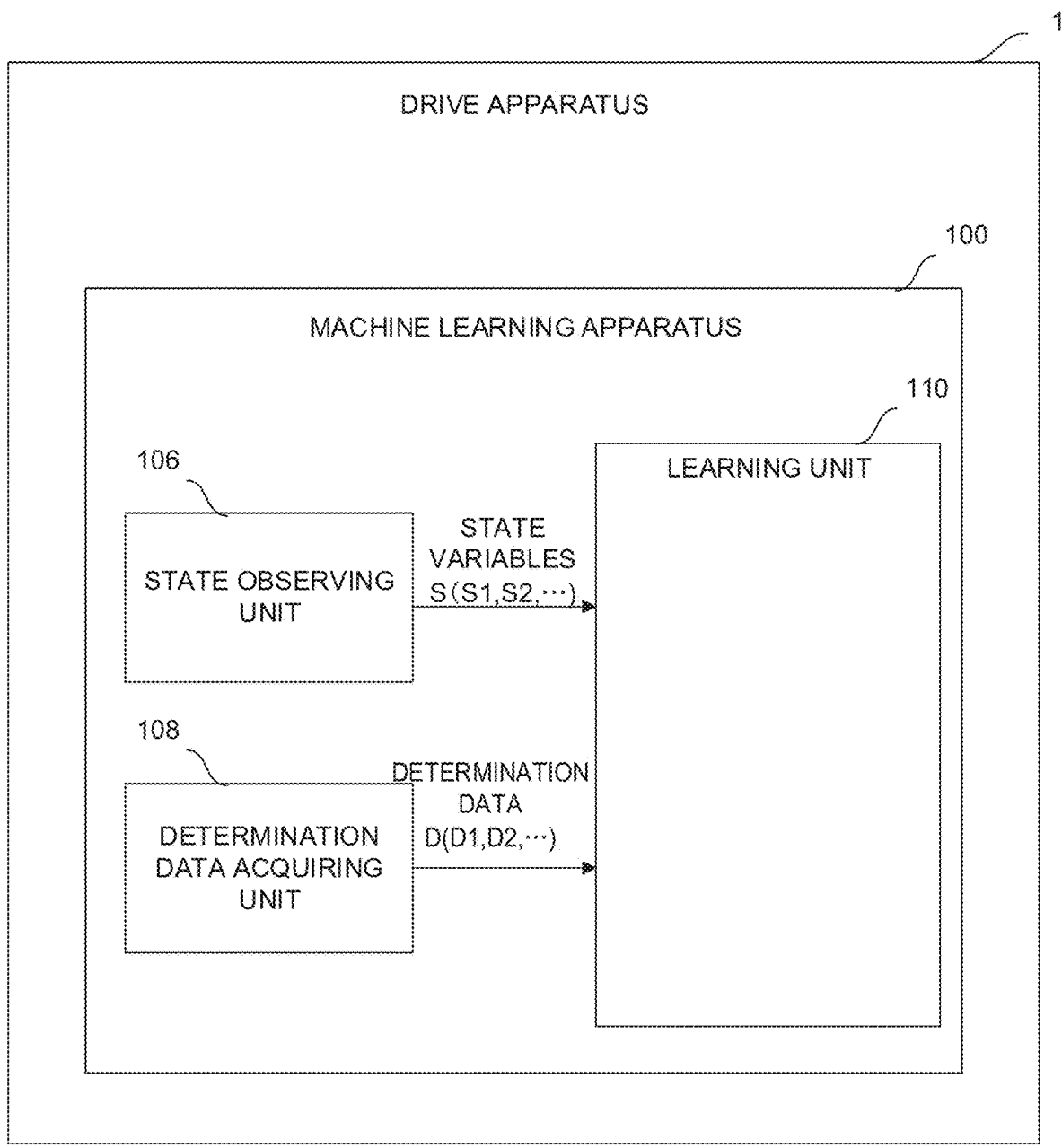
FIG. 2 is a schematic functional block diagram of the drive apparatus according to the first embodiment.

FIG. 2 is a schematic functional block diagram of the drive apparatus 1 and the machine learning apparatus 100 according to the first embodiment. The machine learning apparatus 100 includes a state observing unit 106, a determination data acquiring unit 108, and a learning unit 110. For example, the state observing unit 106, the determination data acquiring unit 108, and the learning unit 110 may be realized as a function of the processor 101. Alternatively, for example, the state observing unit 106, the determination data acquiring unit 108, and the learning unit 110 can be realized by having the processor 101 execute software stored in the ROM 102.

The state observing unit 106 observes state variables S representing a present state of an environment. The state variables S include a command value S1 obtained by converting and correcting an analog voltage command value including an error, an analog voltage command value S2 including an error, and various pieces of information indicating a state of a processing machine. For example, when the processing machine is an injection molding machine, the state variables S may include axis information S3 related to states of all of the axes of the injection molding machine, a cycle time S4 of the injection molding machine, a temperature S5 of the injection molding machine, material information S6 related to resin material, and die information S7 related to a die.

The command value S1 is a command value generated by subjecting the analog voltage command value S2 (to be described later) to A/D conversion and applying a correction thereto. A sequence of the A/D conversion and the correction may be reversed. The correction process can be performed by the processor 101 by adding a prescribed offset to an input analog voltage, multiplying a part (such as a leading edge) of a waveform of an analog voltage by a prescribed coefficient to change the waveform, and the like. A wide variety of the command values S1 can be obtaining by varying the offset, the coefficient, and the like.

The analog voltage command value S2 is an analog voltage value input as an external command from the control apparatus 80 to the drive apparatus 1. The state observing unit 106 is capable of acquiring the analog voltage command value S2 from the drive apparatus 1.

The axis information S3 is a speed command value, a torque command value, a position feedback, a speed feedback, a torque feedback, a motor current value, a motor temperature, and the like of all of or one or more arbitrary axes of the injection molding machine. The state observing unit 106 acquires the axis information S3 from the drive apparatus 1. The drive apparatus 1 is capable of acquiring these pieces of information from the control apparatus 80.

The cycle time S4 is a cycle time of processing in the injection molding machine. The state observing unit 106 acquires the cycle time S4 from the drive apparatus 1. The drive apparatus 1 is capable of acquiring this information from the control apparatus 80.

The temperature S5 represents a temperature of each unit of the injection molding machine. The state observing unit 106 acquires the temperature S5 from the drive apparatus 1. The drive apparatus 1 is capable of acquiring this information from the control apparatus 80.

The material information S6 is information indicating a shape (for example, an identifier uniquely indicating a shape) and a raw material (for example, an identifier uniquely indicating a raw material) of a resin material used in the injection molding machine. The state observing unit 106 acquires the material information S6 from the drive apparatus 1. The drive apparatus 1 is capable of acquiring these pieces of information from the control apparatus 80.

The die information S7 is information indicating a shape (for example, an identifier uniquely indicating a shape) and a raw material (for example, an identifier uniquely indicating a raw material) of a die used in the injection molding machine. The state observing unit 106 acquires the die information S7 from the drive apparatus 1. The drive apparatus 1 is capable of acquiring these pieces of information from the control apparatus 80.

The determination data acquiring unit 108 acquires determination data D that is an index indicating a result when the servo motor is driven under the state variables S. The determination data D includes a precision D1 which is information related to a precision and a quality of a processed product, and various pieces of information indicating a state of a processing machine. For example, when the processing machine is an injection molding machine, the information may include a vibration D2 of the injection molding machine, a die, a ball screw, or the like, a load D3 on the servo motor 50, power consumption D4 by the injection molding machine, a cycle time D5 of the injection molding machine, and a response time D6 of the servo motor 50.

As the precision D1, for example, the determination data acquiring unit 108 can use a value indicating an error between dimensions and design values of the processed product. As the precision D1, an evaluation value indicating a quality (such as a state of a surface) of the processed product can also be used. Since an acquisition method, an evaluation method, and the like of the error and the evaluation value described above are known techniques, detailed descriptions will be omitted herein. For example, the error and the evaluation value may be measured inside a processing machine or measured by an inspection machine or the like other than the processing machine. A measurement result by the inspection machine is input to the control apparatus 80. The drive apparatus 1 acquires these pieces of information from the control apparatus 80 and the determination data acquiring unit 108 acquires these pieces of information from the drive apparatus 1.

As the vibration D2, the determination data acquiring unit 108 is capable of acquiring information (a displacement, a speed, an acceleration, or the like) which indicates a vibration of the injection molding machine, a die, a ball screw, or the like from the drive apparatus 1. The drive apparatus 1 is capable of acquiring these pieces of information from the control apparatus 80.

As the load D3, the determination data acquiring unit 108 is capable of acquiring information indicating a load on the servo motor 50 from the drive apparatus 1. The load on the servo motor 50 can be acquired by the control apparatus 80. The drive apparatus 1 acquires this information from the control apparatus 80 and the determination data acquiring unit 108 acquires this information from the drive apparatus 1.

As the power consumption D4, the determination data acquiring unit 108 is capable of acquiring information indicating power consumption by the injection molding machine from the drive apparatus 1. The drive apparatus 1 is capable of acquiring this information from the control apparatus 80.

As the cycle time D6, the determination data acquiring unit 108 is capable of acquiring information indicating a cycle time of the injection molding machine from the drive apparatus 1. The drive apparatus 1 is capable of acquiring this information from the control apparatus 80.

As the response time D6, the determination data acquiring unit 108 is capable of acquiring a response time of the servo motor 50 or, in other words, a time from the output of a command value until speed, torque, or the like reaches the command value from the drive apparatus 1. The response time of the servo motor 50 can be acquired by the control apparatus 80. The drive apparatus 1 acquires this information from the control apparatus 80 and the determination data acquiring unit 108 acquires this information from the drive apparatus 1.

Using the state variables S and the determination data D, the learning unit 110 learns correlations between the analog voltage command value S2 that includes an error and the state of the processing machine (the axis information S3, the cycle time S4, the temperature S5, the material information S6, and the die information S7), and the command value S1. In other words, the learning unit 110 generates model structures indicating a correlativity of the components S1, S2, S3, S4, S5, S6, and S7 of the state variables S.

When considered in terms of a learning period in the learning unit 110, the state variables S input to the learning unit 110 are data of one learning period before a learning period during which the determination data D had been acquired. While the machine learning apparatus 100 carries out learning, in the environment, (1) acquisition of the analog voltage command value S2 that includes an error and the state of the processing machine (the axis information S3, the cycle time S4, the temperature S5, the material information S6, and the die information S7), and the command value S1, (2) driving of the servo motor 50 in accordance with the command value S1 or, in other words, execution of processing, and (3) acquisition of the determination data D are repetitively performed. The determination data D in (3) is an evaluation result of a precision or a quality of a processed product, productivity, efficiency, or the like in processing based on the command value S1.

By repeating such a learning cycle, the learning unit 110 becomes capable of automatically identifying a feature that suggests correlations between the analog voltage command value S2 that includes an error and the state of the processing machine (the axis information S3, the cycle time S4, the temperature S5, the material information S6, and the die information S7), and the command value S1. Although the correlations between the analog voltage command value S2 that includes an error and the state of the processing machine (the axis information S3, the cycle time S4, the temperature S5, the material information S6, and the die information S7), and the command value S1 are substantially unknown at the start of a learning algorithm, the learning unit 110 gradually identifies a feature and interprets correlativity as learning progresses. Once the correlations between the analog voltage command value S2 that includes an error and the state of the processing machine (the axis information S3, the cycle time S4, the temperature S5, the material information S6, and the die information S7), and the command value S1 are interpreted to a level that is moderately reliable, a learning result that is iteratively output by the learning unit 110 becomes usable for performing a selection of an action (decision making) as to what kind of a command value S1 is to be output with respect to the present state or, in other words, the analog voltage command value S2 that includes an error and the state of the processing machine (the axis information S3, the cycle time S4, the temperature S5, the material information S6, and the die information S7). In other words, the learning unit 110 becomes capable of outputting an optimum solution of an action corresponding to the present state.

The state variables S are constituted by data hardly affected by disturbance, and the determination data D is uniquely obtained by having the drive apparatus 1 acquire various pieces of data from the control apparatus 80. Therefore, according to the machine learning apparatus 100, by using a learning result of the learning unit 110, an optimum command value S1 with respect to the present state or, in other words, the analog voltage command value S2 that includes an error and the state of the processing machine (the axis information S3, the cycle time S4, the temperature S5, the material information S6, and the die information S7) can be automatically and accurately obtained without using calculations or estimations. In other words, an optimum command value S1 can be promptly determined by simply comprehending the present state or, in other words, the analog voltage command value S2 that includes an error and the state of the processing machine (the axis information S3, the cycle time S4, the temperature S5, the material information S6, and the die information S7). Therefore, appropriate conversion from an external command to a command can be performed efficiently.

As a modification of the machine learning apparatus 100, using the state variables S and the determination data D obtained for each of a plurality of processing machines of the same type which perform the same operation, the learning unit 110 can learn appropriate command values in the processing machines. According to this configuration, since an amount of data sets including the state variables S and the determination data D which are obtained in a certain period of time can be increased and data sets with greater variety can be input, speed and reliability of learning can be improved.

Figure 3:
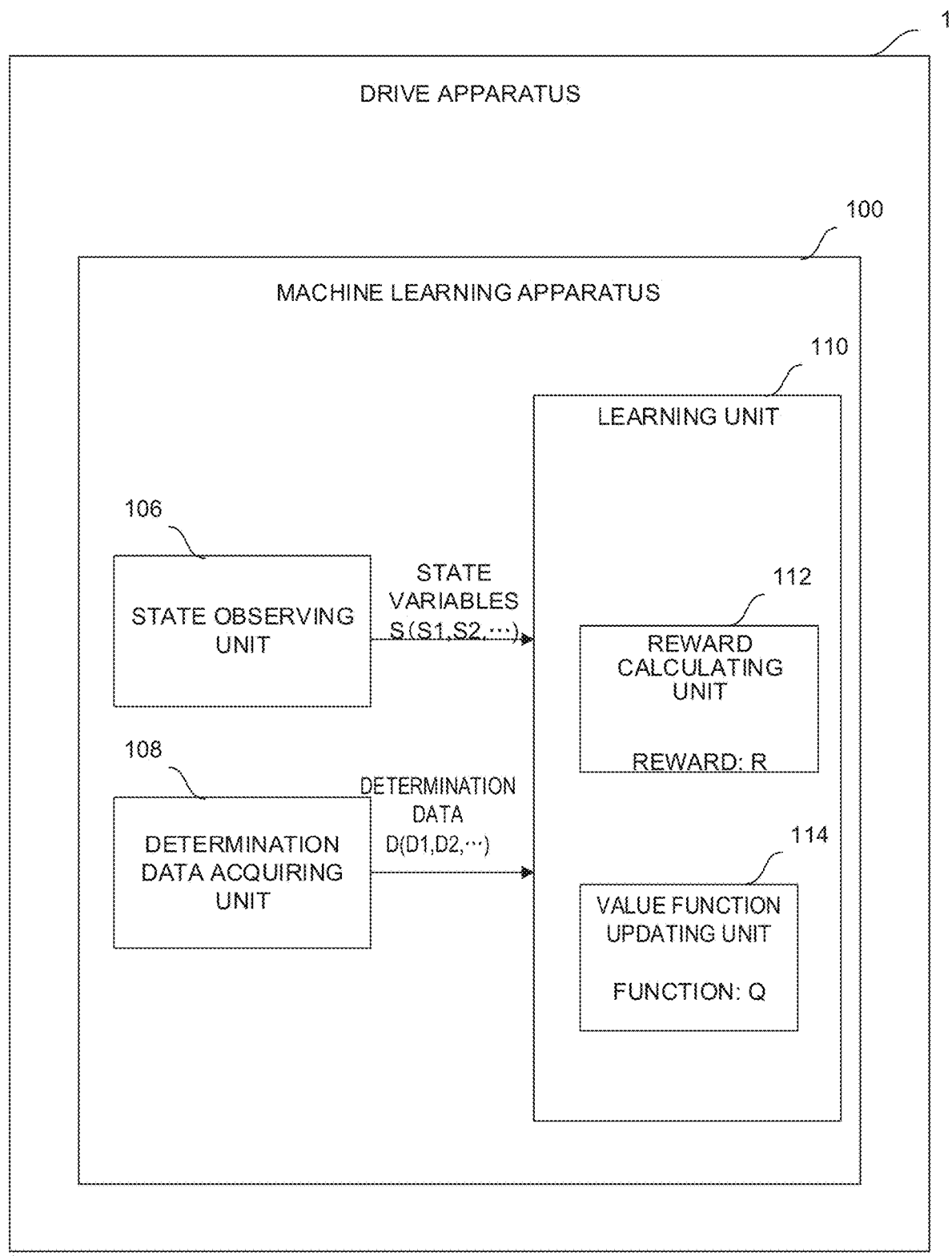
FIG. 3 is a schematic functional block diagram showing an aspect of a drive apparatus.

It should be noted that the learning algorithm executed by the learning unit 110 is not particularly limited and learning algorithms known as machine learning can be adopted. FIG. 3 shows an aspect of the drive apparatus 1 shown in FIG. 1 in which the drive apparatus 1 is configured to include the learning unit 110 which executes reinforcement learning as an example of the learning algorithm. Reinforcement learning is a method involving observing a present state (in other words, an input) of an environment in which a learning object exists and executing a prescribed action (in other words, an output) in the present state, iterating, by trial-and-error, cycles which provide some kind of reward to the action, and learning a strategy which maximizes a total reward (in the present embodiment, an output of a command value) as an optimum solution.

In the machine learning apparatus 100 included in the drive apparatus 1 shown in FIG. 3, the learning unit 110 includes a reward calculating unit 112 and a value function updating unit 114.

The reward calculating unit 112 obtains a reward R related to an evaluation result (which corresponds to the determination data D used in a learning period next to that in which the state variables S had been acquired) of a precision and a quality of a processed product, productivity, efficiency, or the like when processing conditions are set based on the state variables S.

The value function updating unit 114 updates a function Q representing a value of a command value using the reward R. By having the value function updating unit 114 repetitively update the function Q, the learning unit 110 learns correlations between the analog voltage command value S2 that includes an error and the state of the processing machine (the axis information S3, the cycle time S4, the temperature S5, the material information S6, and the die information S7), and the command value S1.

An example of an algorithm for reinforcement learning executed by the learning unit 110 will be described. The algorithm according to this example is known as Q-learning that is a method which uses a state s of an agent of action and an action a that the agent of action may select in the state s as independent variables to learn a function Q (s, a) that represents a value of the action a when selected in the state s. Selecting the action a which maximizes the value function Q in the state s provides an optimum solution. By starting Q-learning in a state where a correlation between the state s and the action a is unknown and repeating trial-and-error of selecting various actions a in an arbitrary state s, the value function Q is iteratively updated and approximated to the optimum solution. In this case, by adopting a configuration so that, when the environment (in other words, the state s) changes as a result of selecting the action a in the state s, a reward (in other words, a weight of the action a) r in accordance with the change is provided and guiding the learning so as to select the action a for which a higher reward r is provided, the value function Q can be approximated to the optimum solution in a relatively short period of time.

An update formula of the value function Q can generally be represented as Expression 1 below. In expression 1, $s_t$ and $a_t$ respectively denote a state and an action at a time t, and the state changes to $s_{t+1}$ due to the action $a_t$. $r_{t+1}$ denotes a reward obtained when the state changes from $s_t$ to $s_{t+1}$. The term of maxQ denotes Q when an action a is performed which (is considered at time t to) produce a maximum value Q at time t+1. $\alpha$ and $\gamma$ respectively denote a learning coefficient and a discount factor and are arbitrarily set within $0<\alpha\le 1$ and $0<\gamma\le 1$.

$$Q(s_t, a_t) \leftarrow Q(s_t, a_t) + \alpha(r_{t+1} + \gamma \max_a Q(s_{t+1}, a) - Q(s_t, a_t)) \quad \text{[Math. 1]}$$

When the learning unit 110 executes Q-learning, the state variables S observed by the state observing unit 106 and the determination data D acquired by the determination data acquiring unit 108 correspond to the state s of the update formula, the action of how to determine the command value S1 with respect to the present state or, in other words, the analog voltage command value S2 that includes an error and the state of the processing machine (the axis information S3, the cycle time S4, the temperature S5, the material information S6, and the die information S7) corresponds to the action a of the update formula, and the reward R obtained by the reward calculating unit 112 corresponds to the reward r of the update formula. Therefore, the value function updating unit 114 repetitively updates the function Q representing a value of the command value with respect to the present state by Q-learning using the reward R.

For example, when the servo motor is driven based on the determined command value S1 and processing is performed and an evaluation result of a precision or a quality of a processed product, productivity, efficiency, or the like is determined as "adequate", the reward calculating unit 112 can set the reward R to a positive value. On the other hand, when an evaluation result of a precision or a quality of a processed product, productivity, efficiency, or the like is determined as "inadequate", the reward calculating unit 112 can set the reward R to a negative value. Absolute values of positive and negative rewards R may be the same or may differ from each other.

For example, cases where the evaluation result of a precision or a quality of a processed product, productivity, efficiency, or the like is determined as "adequate" may include: when the precision D1 (an error between dimensions and design values of the processed product or the like) is smaller than a threshold; when the vibration D2 is smaller than a threshold; when the load D3 is lower than a threshold; when the power consumption D4 is lower than a threshold; when the cycle time D5 is shorter than a threshold; and when the response time D6 is shorter than a threshold. For example, cases where the evaluation result of a precision or a quality of a processed product, productivity, efficiency, or the like is determined as "inadequate" may include when D1 to D6 described above equal or exceed prescribed thresholds. Alternatively, the reward calculating unit 112 may determine propriety by combining a plurality of values included in the determination data D.

The reward calculating unit 112 may determine an evaluation result of a precision or a quality of a processed product, productivity, efficiency, or the like using a value (a change amount, a change rate, or the like within a prescribed period of time or a prescribed cycle) indicating a change over time of D1 to D6 described above. For example, a determination of "adequate" may be made when the change amount of D1 to D6 described above is 0 or takes a negative value while a determination of "inadequate" may be made when the change amount takes a positive value.

An evaluation result of a precision or a quality of a processed product, productivity, efficiency, or the like can not only be set two ways, namely, "adequate" and "inadequate", but can also be set to a plurality of stages. For example, the reward calculating unit 112 can reduce the reward R such that the larger a difference on a positive side between a value of D1 to D6 described above and a prescribed threshold, the smaller the reward R, and increase the reward R such that the larger the difference on a negative side, the larger the reward R. In addition, for example, the reward calculating unit 112 can reduce the reward R such that the larger a difference on a positive side between a change amount or a change rate of D1 to D6 described above and a prescribed threshold, the smaller the reward R, and increase the reward R such that the larger the difference on a negative side, the larger the reward R.

The value function updating unit 114 can have an action value table in which the state variables S, the determination data D, and the reward R are organized in association with an action value (for example, a numerical value) represented by the function Q. In this case, an act of updating the function Q by the value function updating unit 114 is synonymous with an act of updating the action value table by the value function updating unit 114. Since the correlations between the analog voltage command value S2 that includes an error and the state of the processing machine (the axis information S3, the cycle time S4, the temperature S5, the material information S6, and the die information S7), and the command value S1 is unknown at the start of Q-learning, in the action value table, various state variables S, determination data D, and rewards R are prepared in an aspect of being associated with randomly-determined values (the function Q) of the action value. The reward calculating unit 112 is capable of immediately calculating a corresponding reward R once the determination data D is known, in which case the calculated value R is written into the action value table.

When Q-learning is advanced using a reward R in accordance with an evaluation result of a precision or a quality of a processed product, productivity, efficiency, or the like, learning is guided in a direction where an action having a higher reward R is selected, and the action value table is updated as a value (the function Q) of an action value with respect to an action performed in the present state is rewritten in accordance with a state (in other words, the state variables S and the determination data D) of the environment which changes as a result of performing the selected action in the present state. By repeating this update, the value (the function Q) of the action value displayed in the action value table is rewritten such that the more correct the action, the larger the value. In this manner, the previously-unknown correlativity between the present state of the environment or, in other words, the analog voltage command value S2 that includes an error and the state of the processing machine (the axis information S3, the cycle time S4, the temperature S5, the material information S6, and the die information S7), and the command value S1 becomes gradually apparent. In other words, by updating the action value table, the correlations between the analog voltage command value S2 that includes an error and the state of the processing machine (the axis information S3, the cycle time S4, the temperature S5, the material information S6, and the die information S7), and the command value S1, are gradually approximated to an optimum solution.

Figure 4:
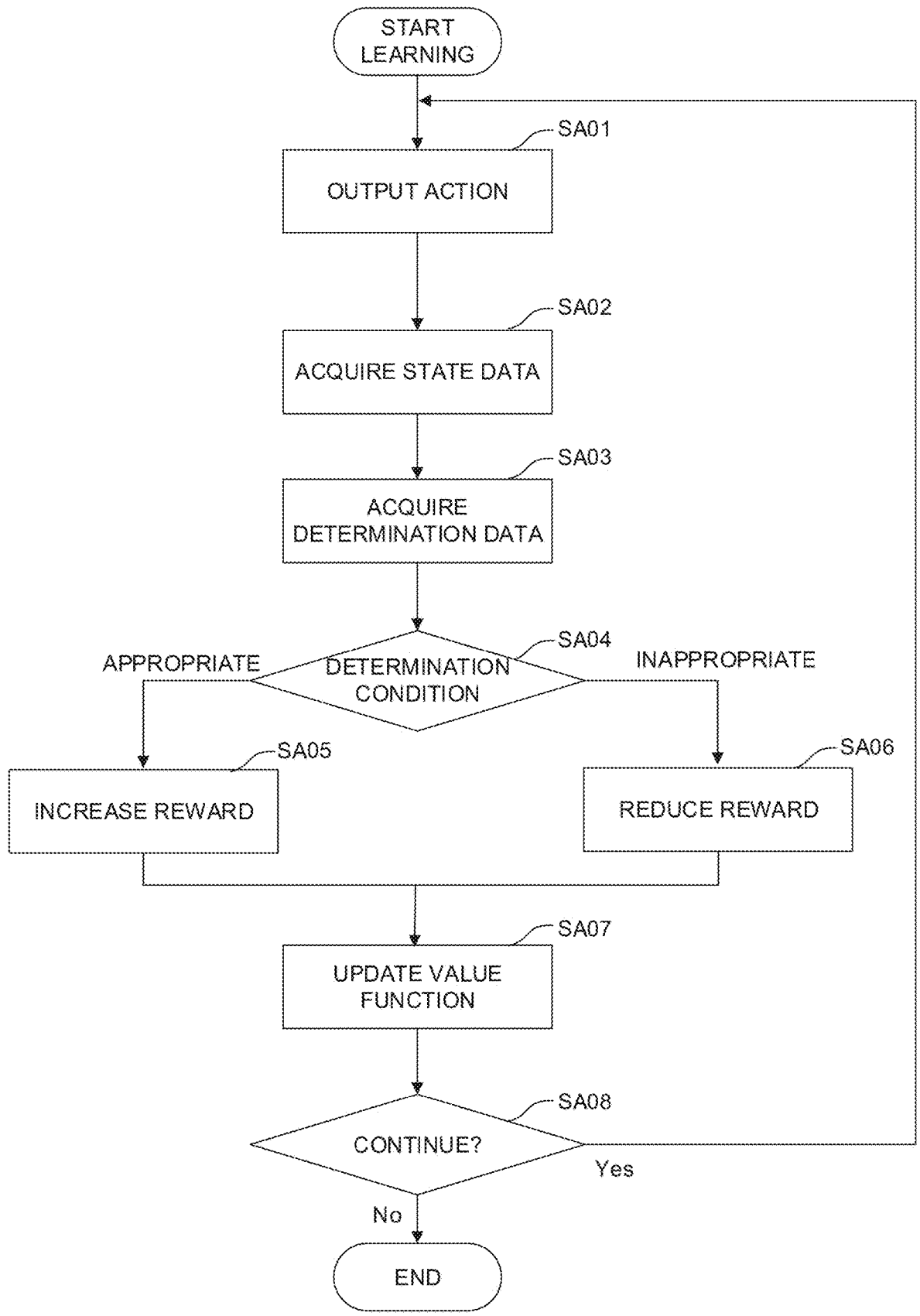
FIG. 4 is a schematic flow chart showing an aspect of a machine learning method.

With reference to FIG. 4, a flow of the Q-learning (in other words, an aspect of a machine learning method) which is executed by the learning unit 110 will be further described.

Step SA01: The value function updating unit 114 refers to the action value table at that time point to randomly select the command value S1 as an action to be performed in the present state indicated by the state variables S observed by the state observing unit 106.

Step SA02: The value function updating unit 114 loads the state variables S of the present state observed by the state observing unit 106.

Step SA03: The value function updating unit 114 loads the determination data D of the present state acquired by the determination data acquiring unit 108.

Step SA04: The value function updating unit 114 determines, based on the determination data D, whether or not the command value S1 is appropriate. When the command value S1 is appropriate, a transition is made to step SA05. When the command value S1 is inappropriate, a transition is made to step SA07.

Step SA05: The value function updating unit 114 applies a positive reward R obtained by the reward calculating unit 112 to an update formula of the function Q.

Step SA06: The value function updating unit 114 updates the action value table using the state variables S and the determination data D in the present state, the reward R, and the value of the action value (the function Q after update).

Step SA07: The value function updating unit 114 applies a negative reward R obtained by the reward calculating unit 112 to an update formula of the function Q.

The learning unit 110 iteratively updates the action value table by repeating steps SA01 to SA07, and advances learning.

It should be noted that the process of obtaining the reward R and the update process of the value function in steps SA04 to SA07 are executed with respect to each piece of data included in the determination data D. For example, FIG. 9 is a flow chart in a case where the response time D6 and the power consumption D4 are used as two pieces of the determination data D.

Step SB01: The value function updating unit 114 refers to the action value table at that time point to randomly select the command value S1 as an action to be performed in the present state indicated by the state variables S observed by the state observing unit 106.

Step SB02: The value function updating unit 114 loads the state variables S of the present state observed by the state observing unit 106.

Step SB03: The value function updating unit 114 loads the determination data D of the present state acquired by the determination data acquiring unit 108.

Step SB04: The value function updating unit 114 determines, based on the response time D6 in the determination data D, whether or not the command value S1 is appropriate. When the command value S1 is appropriate, a transition is made to step SB05. When the command value S1 is inappropriate, a transition is made to step SB06.

Step SB05: The value function updating unit 114 applies a positive reward R1 obtained by the reward calculating unit 112 to an update formula of the function Q.

Step SB06: The value function updating unit 114 applies a negative reward R1 obtained by the reward calculating unit 112 to an update formula of the function Q.

Step SB07: The value function updating unit 114 determines, based on the power consumption D4 in the determination data D, whether or not the command value S1 is appropriate. When the command value S1 is appropriate, a transition is made to step SB08. When the command value S1 is inappropriate, a transition is made to step SB09.

Step SB08: The value function updating unit 114 applies a positive reward R2 obtained by the reward calculating unit 112 to an update formula of the function Q.

Step SB09: The value function updating unit 114 applies a negative reward R2 obtained by the reward calculating unit 112 to an update formula of the function Q.

Step SB10: The value function updating unit 114 updates the action value table using the state variables S and the pieces of determination data D4 and D6 in the present state, the rewards R1 and R2, and the value of the action value (the function Q after update).

A specific example of a learning process carried out in accordance with the flow shown in FIG. 9 will be described.

Example 1

In step SB01, output the following value as the command value S1.
Speed command value S1:
X=speed conversion value of 0.021 V
In step SB02, acquire the following values as the state variables S.
Analog voltage command value S2:
0.021 V (including error of 0.021 V)
Axis information 3 (position feedback):
X=0.001 mm continuous increase
Y=5.000 mm continuous increase
Z=10.000 mm continuous increase
Axis information 3 (speed feedback):
X=0.001 min−1
Y=1.000 min−1
Z=2.000 min−1
In step SB03, acquire the following values as the determination data D.
Response time D6:
100 ms increase
Power consumption D4:
1.0 kWh increase
In step SB04, since the response time D6 has increased, determine that the command value S1 is inappropriate.
In step SB06, reduce the reward R.
In step SB07, since the power consumption D4 has increased, determine that the command value S1 is inappropriate.
In step SB09, reduce the reward R.
In step SB10, update the value Q.

Example 2

In step SB01, output the following value as the command value S1.
Speed command value S1:
X=speed conversion value of 0.000 V
In step SB02, acquire the following values as the state variables S.
Analog voltage command value S2:
0.021 V (including error of 0.021 V)
Axis information 3 (position feedback):
X=0.000 mm stopped state
Y=5.000 mm continuous increase
Z=10.000 mm continuous increase
Axis information 3 (speed feedback):
X=0.000 min−1
Y=1.000 min−1
Z=2.000 min−1
In step SB03, acquire the following values as the determination data D.
Response time D6:
100 ms shorter
Power consumption D4:
1.5 kWh decrease
In step SB04, since the response time D6 has decreased, determine that the command value S1 is appropriate.
In step SB05, increase the reward R.
In step SB07, since the power consumption D4 has decreased, determine that the command value S1 is appropriate.
In step SB08, increase the reward R.
In step SB10, update the value Q.

Figure 5A:
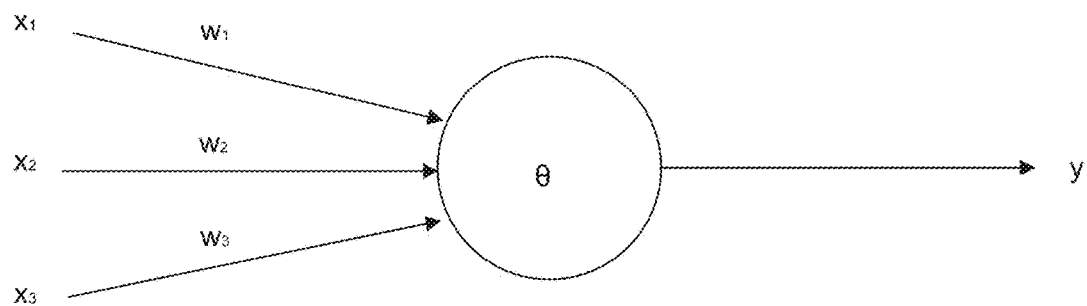
FIG. 5A is a diagram illustrating a neuron.
Figure 5B:
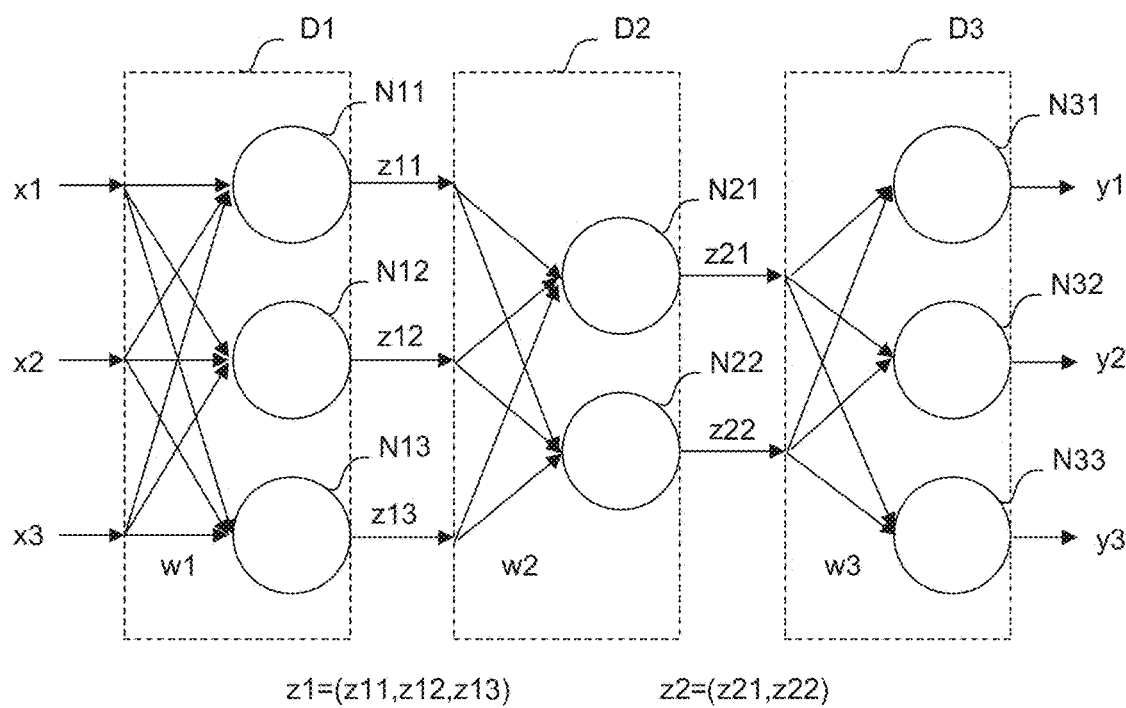
FIG. 5B is a diagram illustrating a neural network.

When advancing reinforcement learning, for example, a neural network can be used instead of Q-learning. FIG. 5A schematically shows a model of a neuron. FIG. 5B schematically shows a model of a three-layer neural network constructed by combining the neurons shown in FIG. 5A. The neural network can be constituted by, for example, a computing apparatus, a storage apparatus, and the like simulating a model of a neuron.

The neuron shown in FIG. 5A outputs a result y with respect to a plurality of inputs x (in this case, as an example, input $x_1$ to input $x_3$). Each of the inputs $x_1$ to $x_3$ is multiplied by a weight w ($w_1$ to $w_3$) corresponding to the input x. Accordingly, the neuron outputs the result y represented by Expression 2 below. It should be noted that, in Expression 2, the input x, the output y, and the weight w are all vectors. In addition, θ denotes a bias and $f_k$ denotes an activation function.

$$y = f_k(\Sigma_{i=1}^n x_i w_i - \theta) \quad \text{[Math. 2]}$$

With the three-layer neural network shown in FIG. 5B, a plurality of inputs x (in this case, as an example, input x1 to input x3) are input from a left side and results y (in this case, as an example, a result y1 to result y3) are output from a right side. In the illustrated example, the respective inputs x1, x2, and x3 are multiplied by corresponding weights (collectively represented by w1), and each of the inputs x1, x2, and x3 is input to three neurons N11, N12, and N13.

In FIG. 5B, outputs of the respective neurons N11 to N13 are collectively represented by z1. z1 can be considered a feature vector obtained by extracting a feature quantity of an input vector. In the illustrated example, the respective feature vectors z1 are multiplied by corresponding weights (collectively represented by w2), and each of the feature vectors z1 is input to two neurons N21 and N22. The feature vectors z1 represent a feature between a weight W1 and a weight W2.

In FIG. 5B, outputs of the respective neurons N21 to N22 are collectively represented by z2. z2 can be considered a feature vector obtained by extracting a feature quantity of the feature vector z1. In the illustrated example, the respective feature vectors z2 are multiplied by corresponding weights (collectively represented by w3), and each of the feature vectors z2 is input to three neurons N31, N32, and N33. The feature vectors z2 represent a feature between the weight W2 and a weight W3. Finally, the neurons N31 to N33 respectively output results y1 to y3.

It should be noted that a method of so-called deep learning using a neural network having three or more layers can also be used.

In the machine learning apparatus 100, by having the learning unit 110 perform a calculation with a multilayered structure in accordance with the neural network using the state variables S and the determination data D as the input x, the command value S1 can be output as the result y. In addition, in the machine learning apparatus 100, by having the learning unit 110 use a neural network as a value function in reinforcement learning and perform a calculation with a multilayered structure in accordance with the neural network using the state variables S and an action a as the input x, a value (the result y) of the action in the state can be output. Operating modes of a neural network include a learning mode and a value prediction mode and, for example, a weight w can be learned using a learning data set in the learning mode and value determination of an action can be performed in the value prediction mode using the learned weight w. Detection, classification, inference, and the like can also be performed in the value prediction mode.

The configuration of the drive apparatus 1 described above can be described as a machine learning method (or program) executed by the processor 101. The machine learning method is a machine learning method of learning appropriate conversion from an external command to the command value S1, the machine learning method including the steps performed by a CPU of a computer of: observing the analog voltage command value S2 that includes an error and the state of a processing machine (the axis information S3, the cycle time S4, the temperature S5, the material information S6, and the die information S7) as state variables S which represent a present state of an environment; acquiring determination data D indicating an evaluation result of a precision or a quality of a processed product, productivity, efficiency, or the like in processing performed in accordance with an output command value S1; and learning the analog voltage command value S2 that includes an error and the state of a processing machine (the axis information S3, the cycle time S4, the temperature S5, the material information S6, and the die information S7), and the command value S1, in association with each other using the state variables S and the determination data D.

Figure 6:
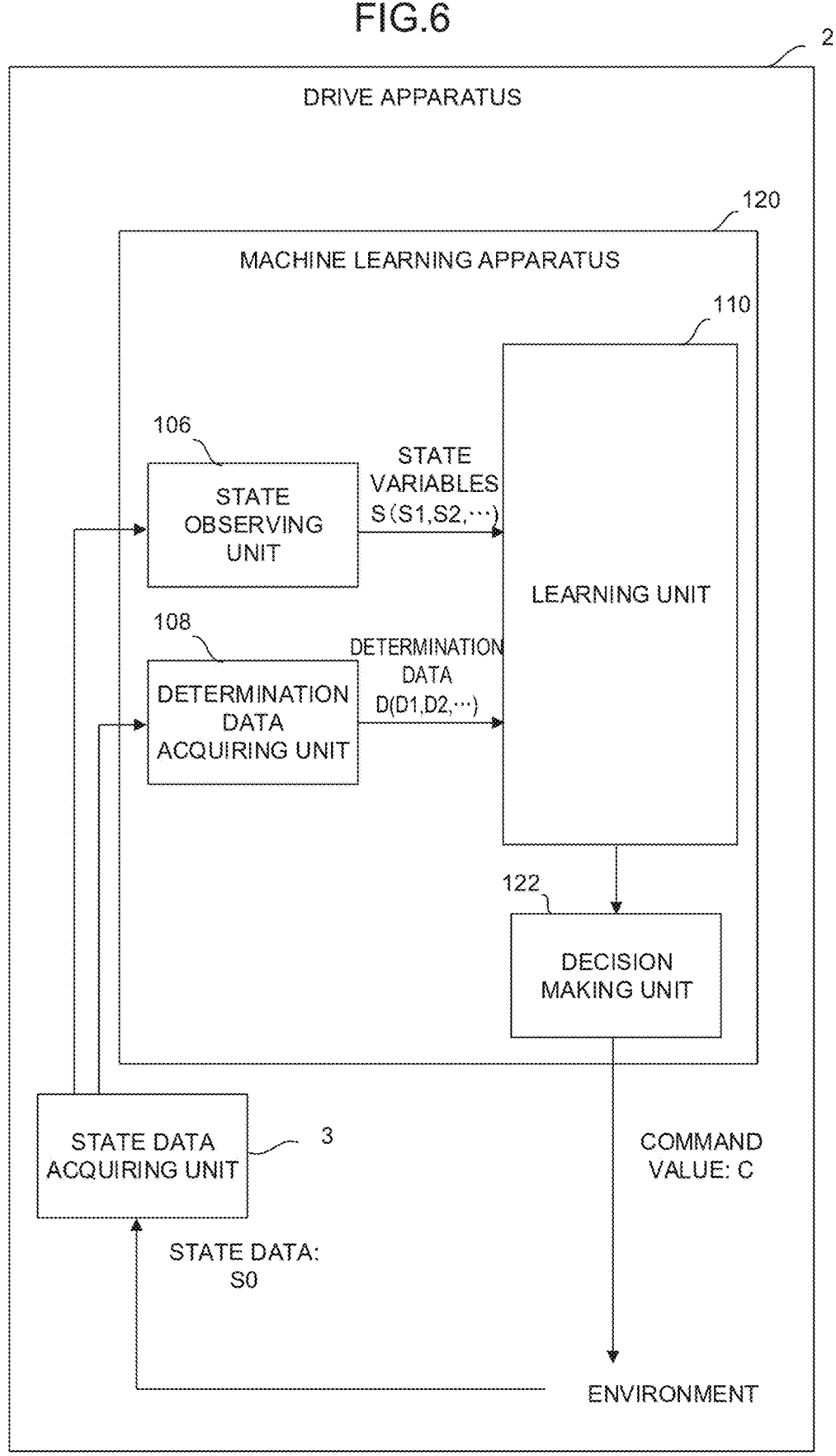
FIG. 6 is a schematic functional block diagram of a drive apparatus according to a second embodiment.

FIG. 6 shows a drive apparatus 2 according to a second embodiment of the present invention. The drive apparatus 2 includes a machine learning apparatus 120 and a state data acquiring unit 3.

The state data acquiring unit 3 acquires the analog voltage command value S2 that includes an error and the state of the processing machine (the axis information S3, the cycle time S4, the temperature S5, the material information S6, and the die information S7), and the command value S1, as state data S0 and supplies the state data S0 to the state observing unit 106. For example, the state data acquiring unit 3 can acquire the state data S0 from the drive apparatus 2.

The machine learning apparatus 120 includes a decision making unit 122 in addition to the state observing unit 106, the determination data acquiring unit 108, and the learning unit 110. For example, the decision making unit 122 may be realized as a function of the processor 101. Alternatively, for example, the decision making unit 122 can be realized by having the processor 101 execute software stored in the ROM 102.

In addition to software (such as a learning algorithm) and hardware (the processor 101 or the like) for learning appropriate conversion from an external command to the command value S1 by itself, the machine learning apparatus 120 includes software (such as an arithmetic algorithm) and hardware (the processor 101 or the like) for outputting the command value S1 obtained based on a learning result as a command to the servo motor 50. Alternatively, the machine learning apparatus 120 may adopt a configuration in which one common processor executes all software including the learning algorithm and the arithmetic algorithm.

Based on a result learned by the learning unit 110, the decision making unit 122 generates a command value C that is the command value S1 corresponding to the analog voltage command value S2 that includes an error and the state of the processing machine (the axis information S3, the cycle time S4, the temperature S5, the material information S6, and the die information S7). Once the decision making unit 122 outputs the command value C to the servo motor 50, the servo motor 50 is driven by the drive apparatus 2 in accordance with the command value C. A state of the environment changes in this manner.

The state observing unit 106 observes, in a next learning period, the state variables S having changed due to the output of the command value C to the environment by the decision making unit 122. The learning unit 110 learns appropriate conversion from an external command to the command value S1 by, for example, updating the value function Q (in other words, the action value table) using the changed state variables S. In doing so, instead of acquiring the command value S1 from the state data S0 acquired by the state data acquiring unit 3, the state observing unit 106 may acquire the command value S1 from the RAM 103 of the machine learning apparatus 120 as described in the first embodiment.

In addition, the decision making unit 122 once again outputs the command value C that is the command value S1 obtained based on the learning result to the servo motor 50. By repeating this learning period, the machine learning apparatus 120 advances learning and gradually improves reliability of the command value S1 determined by the machine learning apparatus 120 itself.

The machine learning apparatus 120 produces a similar effect to the machine learning apparatus 100 according to the first embodiment. In addition, the machine learning apparatus 120 is capable of changing a state of the environment by an output of the decision making unit 122. In the machine learning apparatus 100, a learning result of the learning unit 110 can be reflected onto the environment by having an external apparatus provide functions corresponding to the decision making unit 122.

Figure 7:
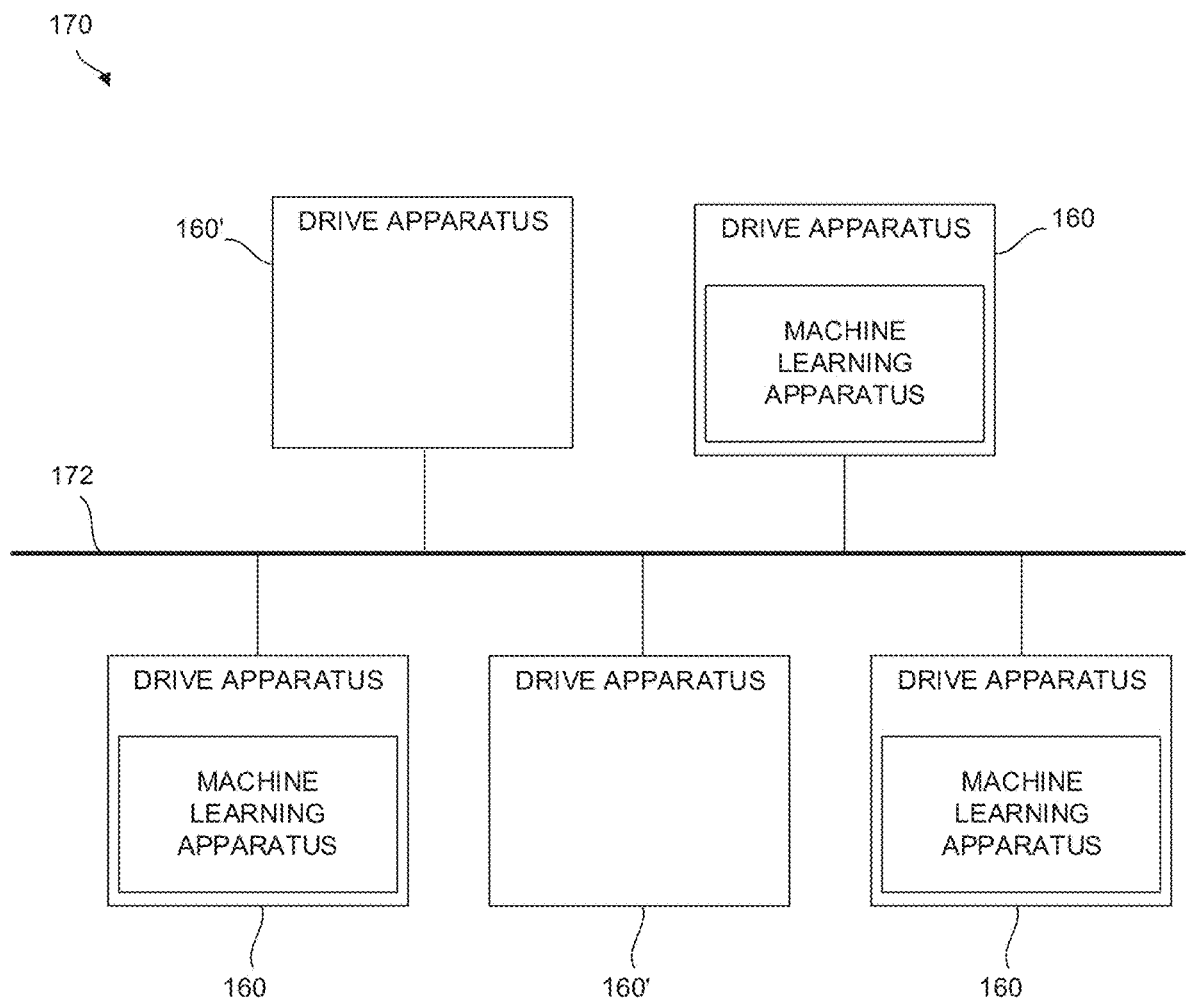
FIG. 7 is a schematic functional block diagram showing an aspect of a system incorporating a drive apparatus.

FIG. 7 shows a system 170 including a plurality of drive apparatuses. The system 170 includes a plurality of drive apparatuses 160 and drive apparatuses 160'. All of the drive apparatuses 160 and the drive apparatuses 160' are connected to each other by a wired or wireless network 172.

The drive apparatuses 160 and the drive apparatuses 160' have a mechanism necessary for operations with the same objective. On the other hand, while the drive apparatuses 160 include the machine learning apparatus 100, the drive apparatuses 160' do not include the machine learning apparatus 100.

The drive apparatuses 160 including the machine learning apparatus 100 are capable of using a learning result of the learning unit 110 to automatically and accurately obtain the command value S1 corresponding to the analog voltage command value S2 that includes an error and the state of the processing machine (the axis information S3, the cycle time S4, the temperature S5, the material information S6, and the die information S7) without using calculations or estimations. In addition, a configuration can be adopted in which the machine learning apparatus 100 of at least one drive apparatus 160 learns appropriate conversion of an external command to the command value S1 common to all of the drive apparatuses 160 and the drive apparatuses 160' based on the state variables S and the determination data D obtained for each of the plurality of other drive apparatuses 160 and the drive apparatuses 160', and a learning result thereof is shared by all of the drive apparatuses 160 and the drive apparatuses 160'. According to the system 170, a speed and reliability of learning of appropriate conversion from an external command to the command value S1 can be improved by using data sets (including the state variables S and the determination data D) with greater variation as input.

Figure 8:
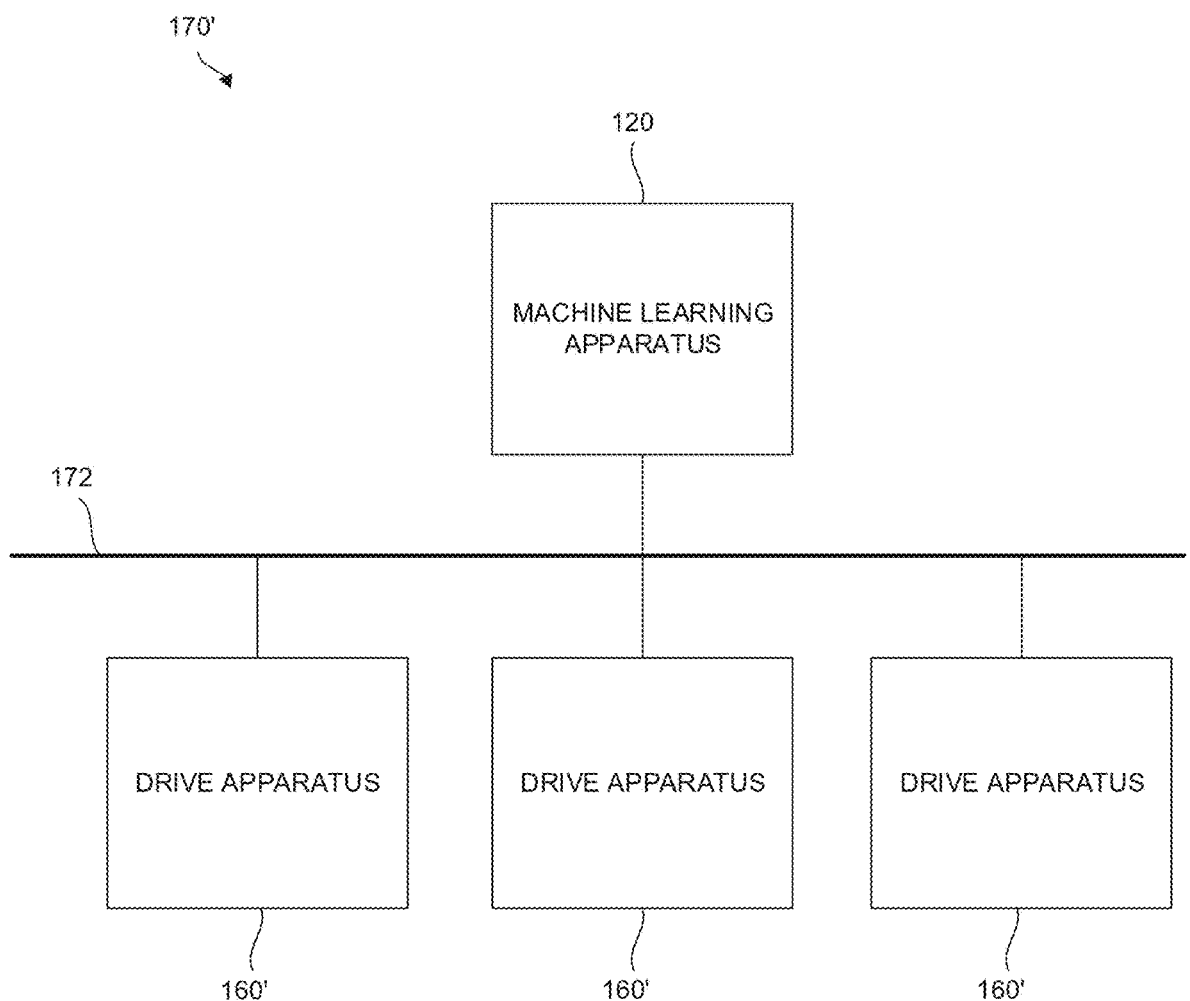
FIG. 8 is a schematic functional block diagram showing another aspect of the system incorporating a drive apparatus.

FIG. 8 shows a system 170' including a plurality of drive apparatuses 160'. The system 170' includes the plurality of drive apparatuses 160' having the same mechanical configuration and the machine learning apparatus 120 (or the machine learning apparatus 100). The plurality of the drive apparatuses 160' and the machine learning apparatus 120 (or the machine learning apparatus 100) are connected to each other by a wired or wireless network 172.

The machine learning apparatus 120 (or the machine learning apparatus 100) learns appropriate conversion of an external command to the command value S1 common to all of the drive apparatuses 160' based on the state variables S and the determination data D obtained for each of the plurality of drive apparatuses 160'. The machine learning apparatus 120 (or the machine learning apparatus 100) is capable of using a learning result thereof to automatically and accurately obtain the command value S1 corresponding to the analog voltage command value S2 that includes an error and the state of the processing machine (the axis information S3, the cycle time S4, the temperature S5, the material information S6, and the die information S7) without using calculations or estimations.

The machine learning apparatus 120 (or the machine learning apparatus 100) may exist in a cloud server or the like provided on the network 172. According to this configuration, regardless of a position or a period of time of existence of each of the plurality of drive apparatuses 160', a necessary number of drive apparatuses 160' can be connected to the machine learning apparatus 120 (or the machine learning apparatus 100) at a necessary time.

An operator working on the system 170 or the system 170' can determine, at an appropriate time after the start of learning by the machine learning apparatus 120 (or 100), whether or not an achievement level of learning of the command value S1 (in other words, reliability of the command value S1 that is output) by the machine learning apparatus 120 (or the machine learning apparatus 100) has reached a required level.

While embodiments of the present invention have been described above, it is to be understood that the present invention is not limited to the examples presented in the embodiments described above and may be implemented in various aspects by making suitable modifications thereto.

For example, the learning algorithm executed by the machine learning apparatus 100 and the machine learning apparatus 120, the control algorithm executed by the drive apparatus 1 and the drive apparatus 2, and the like are not limited to those described above and various algorithms can be adopted.

In addition, while the drive apparatus 1 (or the drive apparatus 2) and the machine learning apparatus 100 (or the machine learning apparatus 120) are explained as apparatuses having different CPUs in the embodiment described above, the machine learning apparatus 100 (or the machine learning apparatus 120) may be configured so as to be realized by the CPU 11 included in the drive apparatus 1 (or the drive apparatus 2) and a system program stored in the ROM 12.

Furthermore, the machine learning apparatus 100 (or the machine learning apparatus 120) may be implemented in information processing environments referred to as cloud computing, fog computing, edge computing, and the like.

Moreover, while an example in which an analog voltage command value is input as an external command has been mainly explained in the embodiment described above, the present invention is not limited thereto and is applicable to all drive apparatuses that drive a device according to a command converted from some kind of an external command.

While embodiments of the present invention have been described above, it is to be understood that the present invention is not limited to the examples presented in the embodiments described above and may be implemented in other aspects by making suitable modifications thereto.

The invention claimed is:

1. A drive apparatus for controlling a speed or a torque of a servo motor of a processing machine according to a command obtained by converting an external command input from outside,
   the drive apparatus comprising a processor implementing a machine learning apparatus which learns appropriate conversion from the external command to the command, wherein
   the machine learning apparatus includes:
   a state observing unit implemented by said processor which observes state variables that represent a present state of an environment, the state variables including
      the external command which is an analog command including an error,
      the command generated by analogue-to-digital (A/D) conversion of the external command and applying correction thereto, and
      a state of the processing machine or the servo motor including at least one of (i) a cycle time of processing, (ii) a shape and a raw material of a material used in the processing, or (iii) a shape and a raw material of a die used in the processing;
   a determination data acquiring unit implemented by said processor which acquires determination data indicating an evaluation result of processing by the processing machine; and
   a learning unit implemented by said processor which learns the external command and the state of the processing machine or the servo motor, and the command, in association with each other using the state variables and the determination data; and
   the drive apparatus controlling the speed or the torque of the servo motor of the processing machine according to the command obtained by converting the external command input from outside.

2. The drive apparatus according to claim 1, wherein the state variables include, as the state of the processing machine or the servo motor, at least one of a speed command value, a torque command value, a position feedback, a speed feedback, a torque feedback, a motor current value, a motor temperature of each axis of the processing machine, or a temperature of each unit of the processing machine.

3. The drive apparatus according to claim 1, wherein the determination data includes at least one of a precision and a quality of a processed product, a vibration of the processing machine, a die, or a ball screw, a load on the servo motor, power consumption by the processing machine, or the cycle time of the processing.

4. The drive apparatus according to claim 1, wherein the learning unit includes:
   a reward calculating unit implemented by said processor which obtains a reward related to the evaluation result; and
   a value function updating unit implemented by said processor which updates, using the reward, a function representing a value of the command with respect to the external command and the state of the processing machine or the servo motor.

5. The drive apparatus according to claim 1, wherein the learning unit implemented by said processor calculates the state variables and the determination data in a multilayered structure.

6. The drive apparatus according to claim 1, further comprising
a decision making unit implemented by said processor which outputs a value of the command based on a learning result by the learning unit.

7. The drive apparatus according to claim 1, wherein the learning unit implemented by said processor performs learning using the state variables and the determination data obtained from a plurality of the drive apparatuses.

8. The drive apparatus according to claim 1, wherein the machine learning apparatus is realized by a cloud computing environment, a fog computing environment, or an edge computing environment.

9. A machine learning apparatus for learning appropriate conversion from an external command that is input to a drive apparatus from outside to a command for controlling a speed or a torque of a servo motor of a processing machine, the machine learning apparatus implemented by a processor and comprising:
a state observing unit implemented by said processor which observes state variables that represent a present state of an environment, the state variables including the external command which is an analog command including an error,
the command generated by analogue-to-digital (A/D) converting and correcting the external command, and
a state of the processing machine or the servo motor including at least one of (i) a cycle time of processing, (ii) a shape and a raw material of a material used in the processing, or (iii) a shape and a raw material of a die used in the processing;
a determination data acquiring unit implemented by said processor which acquires determination data indicating an evaluation result of processing by the processing machine; and
a learning unit implemented by said processor which learns the external command and the state of the processing machine or the servo motor, and the command, in association with each other using the state variables and the determination data; and
the drive apparatus controlling the speed or the torque of the servo motor of the processing machine according to the command obtained by converting the external command input from outside.

* * * * *